(12) United States Patent
Matz

(10) Patent No.: US 6,700,747 B2
(45) Date of Patent: *Mar. 2, 2004

(54) INTEGRATED LEAD HEAD SUSPENSION ASSEMBLY HAVING AN ETCHED LAMINATED LOAD BEAM AND FLEXURE WITH DEPOSITED CONDUCTORS

(75) Inventor: Robert T. J. Matz, Cologne, MN (US)

(73) Assignee: Hutchinson Technology Incorporated, Hutchinson, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/302,607

(22) Filed: Apr. 30, 1999

(65) Prior Publication Data
US 2001/0001588 A1 May 24, 2001

Related U.S. Application Data

(62) Division of application No. 09/003,186, filed on Jan. 6, 1998, now Pat. No. 5,924,187.

(51) Int. Cl.[7] .................................................. G11B 5/48
(52) U.S. Cl. ...................................................... 360/245.9
(58) Field of Search .......................... 360/245.8, 245.9

(56) References Cited

U.S. PATENT DOCUMENTS

| 4,996,623 A | * | 2/1991 | Erpelding et al. ........... 360/104 |
| 5,111,351 A | | 5/1992 | Hamilton .................... 360/104 |
| 5,163,218 A | | 11/1992 | Hamilton .................... 29/603 |
| 5,454,158 A | | 10/1995 | Fontana, Jr. et al. .......... 29/603 |
| 5,491,597 A | | 2/1996 | Bennin et al. ............... 360/104 |
| 5,526,208 A | * | 6/1996 | Hatch et al. ................ 360/109 |
| 5,597,496 A | | 1/1997 | Masaichi et al. ............. 216/94 |
| 5,598,307 A | * | 1/1997 | Bennin ..................... 360/245.9 |
| 5,608,591 A | | 3/1997 | Klaassen .................... 360/104 |
| 5,644,454 A | * | 7/1997 | Arya et al. .................. 360/106 |
| 5,666,717 A | | 9/1997 | Matsumoto et al. ......... 29/603.12 |
| 5,694,270 A | | 12/1997 | Sone et al. .................. 360/104 |
| 5,701,218 A | * | 12/1997 | Boutaghou ............... 360/245.9 |

(List continued on next page.)

FOREIGN PATENT DOCUMENTS

| GB | 2312082 | | 10/1997 |
| JP | 6-243449 | * | 9/1994 |
| JP | 9035223 | | 2/1997 |
| WO | WO 97/36290 | | 10/1997 |

OTHER PUBLICATIONS

Schudel, "Wireless Suspensions" presentation materials, KR Precision Public Company, Limited, Mar., 1997, 20 pages (including "KRP's FAST" materials).
Takada, "Wireless Suspension (CAPS)" literature of Fujitsu Limited, 13 pages.
Schulz et al., "Emerging Flex Market," Printed Circuit Fabrication, Jan. 1998, pp. 34–35.
Ohwe et al., "Development of Integrated Suspension System for a Nanoslider with an MR Head Transducer," IEEE Transactions on Magnetics, vol. 29, No. 6, Nov. 1993, pp. 3925–3926.

Primary Examiner—Brian E. Miller
(74) Attorney, Agent, or Firm—Faegre & Benson LLP

(57) ABSTRACT

A head suspension having a load beam and flexure both including electrical components formed integrally therewith. The load beam is formed using subtractive methods such as chemical etching to reduce the cost of forming the load beam. The flexure is formed using additive methods such a sputtering, evaporation, or photolithographic techniques to allow the electrical components to be relatively low mass and flexible. The flexure electrical components are electrically interconnected with the load beam electrical components. In this way, the head suspension is formed having reduced cost and desirable dynamic characteristics.

10 Claims, 7 Drawing Sheets

U.S. PATENT DOCUMENTS

| | | | |
|---|---|---|---|
| 5,742,998 A | | 4/1998 | Jones, Jr. ................. 29/603.14 |
| 5,754,368 A | | 5/1998 | Shiraishi et al. ............ 360/104 |
| 5,768,062 A | * | 6/1998 | Anderson et al. ........... 360/106 |
| 5,796,552 A | | 8/1998 | Akin, Jr. et al. .............. 29/603 |
| 5,796,554 A | * | 8/1998 | Berding et al. ............. 360/104 |
| 5,796,556 A | * | 8/1998 | Boutaghou ................. 360/104 |
| 5,805,381 A | * | 9/1998 | Resh ....................... 360/245.5 |
| 5,839,193 A | | 11/1998 | Bennin et al. ............. 29/896.9 |
| 5,844,753 A | * | 12/1998 | Inaba ......................... 360/104 |
| 5,857,257 A | * | 1/1999 | Inaba ..................... 29/603.04 |
| 5,864,446 A | * | 1/1999 | Endo et al. ................. 360/104 |
| 5,875,070 A | * | 2/1999 | Khan et al. ................. 360/104 |
| 5,883,758 A | * | 3/1999 | Bennin et al. .............. 360/104 |
| 5,901,016 A | * | 5/1999 | Iwamoto ................. 360/245.9 |
| 5,924,187 A | * | 7/1999 | Matz ....................... 29/603.03 |
| 5,991,121 A | * | 11/1999 | Kanda ..................... 360/245.9 |
| 6,055,132 A | * | 4/2000 | Arya et al. ............... 360/245.9 |
| 6,057,986 A | * | 5/2000 | Takasugi ................. 360/245.9 |
| 6,151,196 A | * | 11/2000 | Carlson et al. .......... 360/245.9 |

* cited by examiner

INTEGRATED LEAD HEAD SUSPENSION ASSEMBLY HAVING AN ETCHED LAMINATED LOAD BEAM AND FLEXURE WITH DEPOSITED CONDUCTORS

REFERENCE TO RELATED APPLICATION

This application is a divisional of application Ser. No. 09/003,186 filed on Jan. 6, 1998, now U.S. Pat. No. 5,924,187 and which is hereby incorporated by reference in its entirety.

BACKGROUND

1. Technical Field

The present invention relates generally to suspensions for supporting read/write heads over recording media. In particular, the present invention is an integrated lead head suspension having a load beam etched from laminated sheets of material and a flexure additively fabricated by depositing conductors on a base layer.

2. Background of the Invention

Head suspensions are well known and commonly used with dynamic magnetic and/or optical storage devices or drives with rigid disks. The head suspension is a component within the disk drive which supports a read/write head over a desired position on the storage media (typically a data track on a spinning, rigid disk) where information is to be retrieved or transferred. A head suspension includes a load beam having a flexure to which a head slider having a read/write head is to be mounted.

The load beam includes a mounting region at a proximal end, a rigid region adjacent to a distal end and a spring region between the mounting region and rigid region. The spring region is relatively resilient and provides a downward bias force at the distal tip of the load beam for holding the read/write head near the spinning disk in opposition to an upward force created by an air bearing over the disk. The head slider allows the read/write head to "fly" above the disk on this air bearing. The flexure is to allow pitch and roll motion of the head slider and read/write head as they move over the data tracks of the disk. Via the mounting region of the load beam, the head suspension can be mounted to an actuator arm for coupling the head suspension to a voice coil or other type of actuator. Both linear and rotary type actuators are known in the art.

Manufacturers of head suspensions face competing design considerations. On one hand, it is important that head suspensions have relatively low mass and be relatively flexible. This is necessary to allow the head slider and read/write head to fly closely above the surface of the spinning data disk (on the order of 0.1 $\mu$m) without colliding with the disk ("crashing") and still allow for imperfections in the disk surface and/or variations in the air bearing on which the head slider is flying. Flexibility is particularly important in the sensitive spring and flexure areas. Also, when the actuator stops the head suspension over a particular data track to read or write information, the deceleration can cause an inertial shock in the head suspension which causes transient vibrations. Data cannot be stored or retrieved until these vibrations substantially subside. In general, the lower the mass of the head suspension, the lower the inertial shock and ensuing transient vibrations. Therefore, a lower mass head suspension can decrease data access times. Finally, a lower mass head suspension requires less energy for the actuator to move the read/write head over the data disk surface. This can be particularly important in systems in which low energy consumption is advantageous, such as battery powered computer systems. In sum, a lower mass head suspension can either decrease access times, use less energy, or both.

On the other hand, head suspensions carry electrical components. For example, electrical read/write signals must be transferred to and from the read/write head, across the head suspension, to processing electronics. Electrical conductors can be included on the head suspension to facilitate this transfer of signals. These conductors can consist of copper wires encapsulated in a plastic tubing or coated with a dielectric material. Such standard conductors can have a large effect on head suspension performance. For example, a standard conductor placed atop a thin suspension can more than double a spring region's stiffness and detract from the ability of a spring region to adjust to variations in the surface of the disk. The effect of standard conductors on a flexure region, the thinnest and most delicate spring in the head suspension, is even more pronounced. Further, electrical components such as conductors add mass to the head suspension.

To help alleviate the difficulties in including electrical components on the head suspension, it is known to form such electrical components integrally with the head suspension. Such head suspensions are known as integrated lead or wireless head suspensions. Various methods exist for manufacturing head suspensions in this way.

One such method involves an additive or deposition process wherein multiple layers of different materials are built up on a substrate layer by sputtering, plating, chemical vapor deposition, ion beam deposition, evaporation, photo-lithographic techniques or other known processes. For example, a substrate layer can be formed from a rigid material such as stainless steel, an intermediate layer can be polyimide or other dielectric, and an upper layer can be an electrical conductor such as copper and formed in strips extending between the desired locations on the head suspension. Such additive techniques are known in the art and disclosed in, for example, U.S. Pat. No. 5,454,158 for Method of Making Integral Transducer-Suspension Assemblies for Longitudinal Recording, issued to Fontana, et al. on Oct. 3, 1995 and U.S. Pat. No. 5,111,351 for Integrated Magnetic Read/Write Head/Flexure/Conductor Structure, issued to Hamilton on May 5, 1992.

Using additive methods it is possible to form relatively thin, and therefore, flexible and relatively low mass electrical components. As such, the head suspension on which such components are formed can remain relatively flexible and low in mass. However, using additive methods can be relatively expensive because the equipment used to carry out additive processes is designed to accommodate relatively small semi-conductor components. Thus, relatively larger head suspension components can be manufactured in only relatively small batches. Accordingly, using additive methods to manufacture relatively large quantities of head suspension components can become time consuming and expensive.

A second method for forming electrical components integrally with a head suspension involves a subtractive method in which the starting material has a plurality of laminated layers which are chemically etched or otherwise removed to form the electrical components. For example, the starting material can be a laminated sheet having a lower layer of stainless steel or other rigid material, a middle layer of dielectric such a polyimide, and an upper layer of electrically conductive material such as copper. The layers may be successively chemically etched using known methods to form electrical leads or other electrical components from the conductive layer which are insulated from the rigid layer by the dielectric layer. Such methods are known in the art and disclosed in U.S. Pat. No 5,598,307, issued Jan. 28, 1997 to Bennin for Integrated Gimbal Suspension Assembly, which is hereby incorporated by reference in its entirety.

At present, using subtractive methods, it is problematic to produce electrical leads or other components that are as thin, low mass, and flexible as those which can be produced using additive methods. However, it is generally less expensive to manufacture head suspension using subtractive methods.

It is evident that there is a continuing need for improved methods for fabricating head suspensions and/or parts thereof. In particular, electrical components formed integrally with the head suspension should be suitably thin, low mass and flexible and yet relatively cost effective to manufacture.

SUMMARY OF THE INVENTION

The present invention is an integrated lead head suspension having a load beam and a flexure. The load beam is formed from a laminated sheet having a rigid base layer and an electrically conducting layer. The load beam includes a mounting region at a proximal end, a rigid region adjacent to a distal end, and a spring region between the mounting region and the rigid region. Electrical conductors are formed on the load beam by etching the electrically conducting layer. The flexure is for supporting a head slider and is formed by depositing electrical conductors over a base layer. The flexure is attached to the distal end of the load beam and the electrical conductors of the flexure are electrically interconnected with the electrical conductors of the load beam.

DETAILED DESCRIPTION

Figure 1:
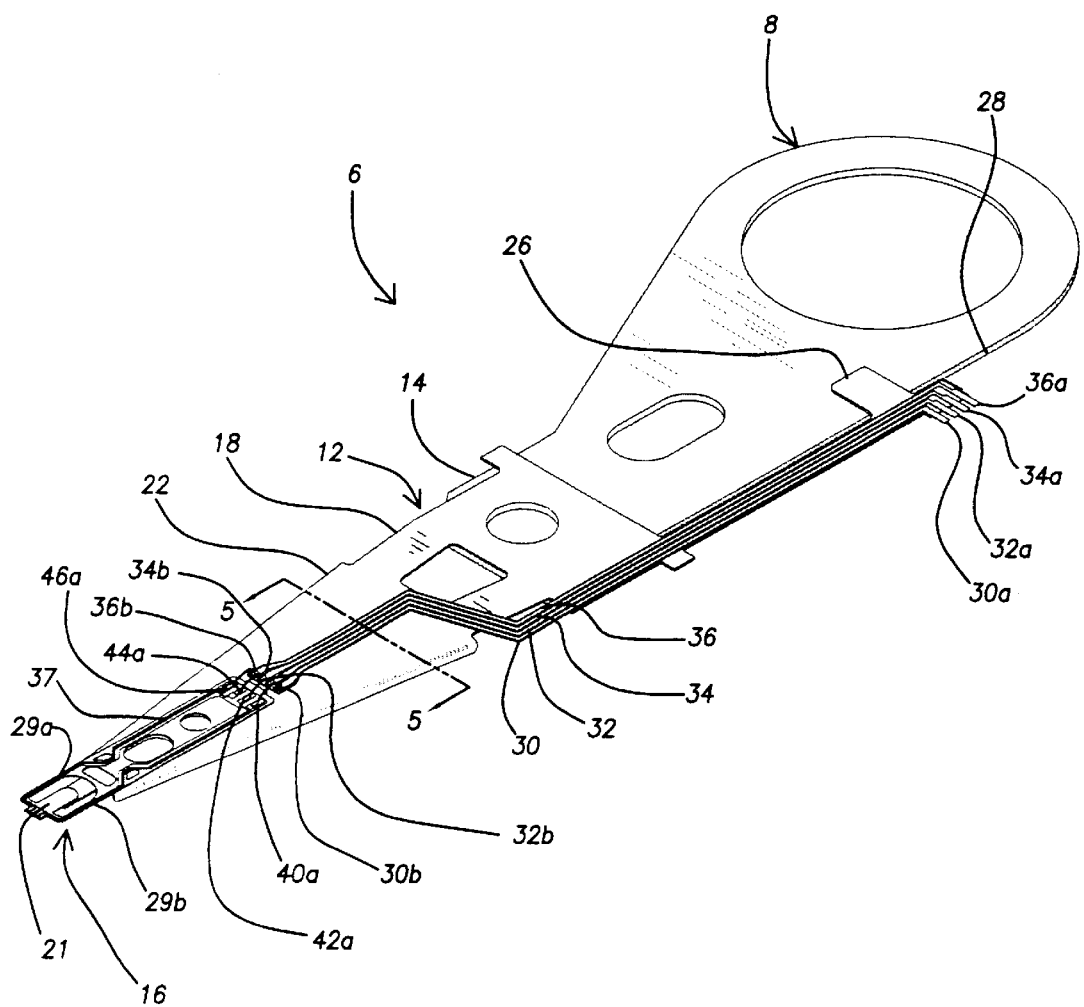
FIG. 1 is a bottom isometric view of a head suspension mounted to an actuator arm, the head suspension including a load beam and flexure and having integrated lead conductors formed thereon in accordance with the present invention.

Head suspension 6 in a first embodiment of the present invention, is shown in an isometric view in FIG. 1. Head suspension 6 includes a load beam 12 having a base or mounting region 14 on a proximal end, a relatively rigid region 22 adjacent to a distal end, and a radius or spring region 18 between the mounting region 14 and rigid region 22. Head suspension 6 also includes a flexure 16 at the distal end of load beam 12 for supporting a head slider (not shown) having a read/write head. Head suspension 6 is mounted to an actuator arm 8 for attachment to an actuator (not shown). Though not required in the embodiment shown in FIG. 1, it is contemplated that a base plate (not shown) can be mounted to mounting region 14.

The spring region 18 of the load beam 12 typically includes a formed bend or radius. This radius provides the spring or load force and thus a desired load to a head slider for a predetermined offset height, the offset height being a measurement of the distance between the mounting surface of the head suspension at the actuator arm and the air bearing surface of the head slider at "fly" height, which is the distance above the surface of a spinning disk at which the head slider moves when transferring data to and from the disk.

A resilient connection is provided between the head slider and the distal end of the load beam 12 by the flexure 16. Flexure 16 permits the head slider to move in pitch and roll directions so that it can compensate for fluctuations of a spinning disk surface above which the head slider "flies." The illustrated embodiment of flexure 16 includes tongue 21 supported between spring arms 29a and 29b which extend from a mounting region 37 which is formed by a portion of the surface of flexure 16. Flexure 16 also includes alignment apertures 60 and 62 in the mounting region 37 for alignment with load beam 12 when mounting flexure 16 thereto. Many different types of flexures, also known as gimbals, are known to provide the spring connection allowing for pitch and roll movement of the head slider and are contemplated to be used with the present invention.

Figure 5:
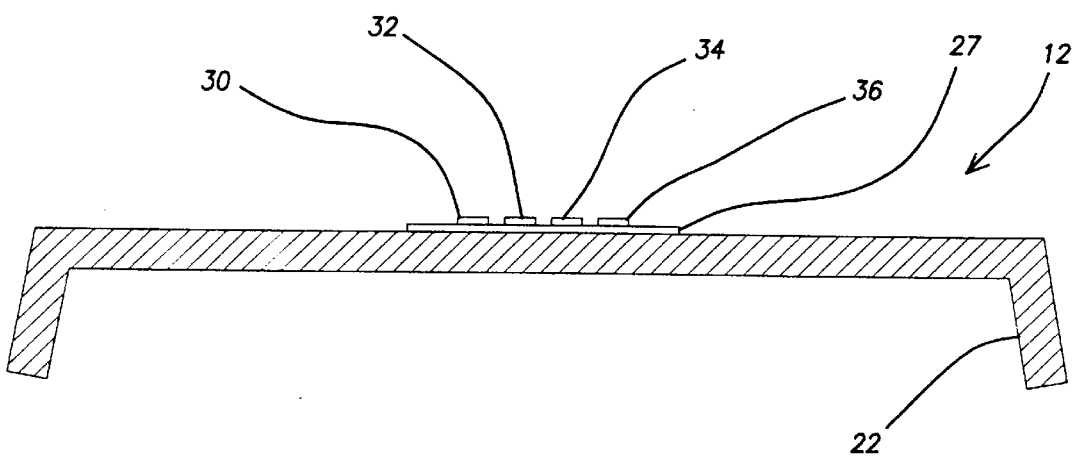
FIG. 5 is a sectional view of the load beam shown in FIG. 1 taken along section line 5—5 of FIG. 1.

Load beam 12 includes load beam electrical conductors 30, 32, 34, and 36, shown in FIG. 5, which is a section view of load beam 12 taken along line 5—5 of FIG. 1, extending from a location on a lateral edge 28 of actuator arm 8 to a location on the rigid region 22 of load beam 12. At the lateral edge 28 of actuator arm 8, electrical conductors 30, 32, 34, and 36 terminate with electrical contacts 30a, 32a, 34a, and 36a, respectively. The opposite end of conductors 30, 32, 34, and 36 terminate in the rigid region 22 with electrical contacts 30b, 32b, 34b, and 36b, respectively. At a location distal to the spring region 18, conductors 30, 32, 34, and 36 extend transversely across load beam 12 and off the load beam such that conductors 30, 32, 34, and 36 primarily extend longitudinally adjacent to the radius region 18 rather than longitudinally thereover. Conductors 30, 32, 34, and 36 then extend past the mounting region 14 and adjacent to actuator arm 8. Conductors 30, 32, 34, and 36 are attached to actuator arm 8 by tab 26.

As shown in FIG. 5, a strip 27 of dielectric material extends beneath conductors 30, 32, 34, and 36 and contacts 30a, 30b, 32a, 32b, 34a, 34b, 36a, and 36b as they extend over load beam 12. Strip 27 also supports electrical conductors 30, 32, 34, and 36 in the regions where they extend off of load beam 12. Strip 27 electrically insulates conductors 30, 32, 34, and 36 and contacts 30a, 30b, 32a, 32b, 34a, 34b, 36a, and 36b from load beam 12. Tab 26 also extends from strip 27 in the region of contacts 30a, 32a, 34a, and 36a, for support thereof.

Figure 4:
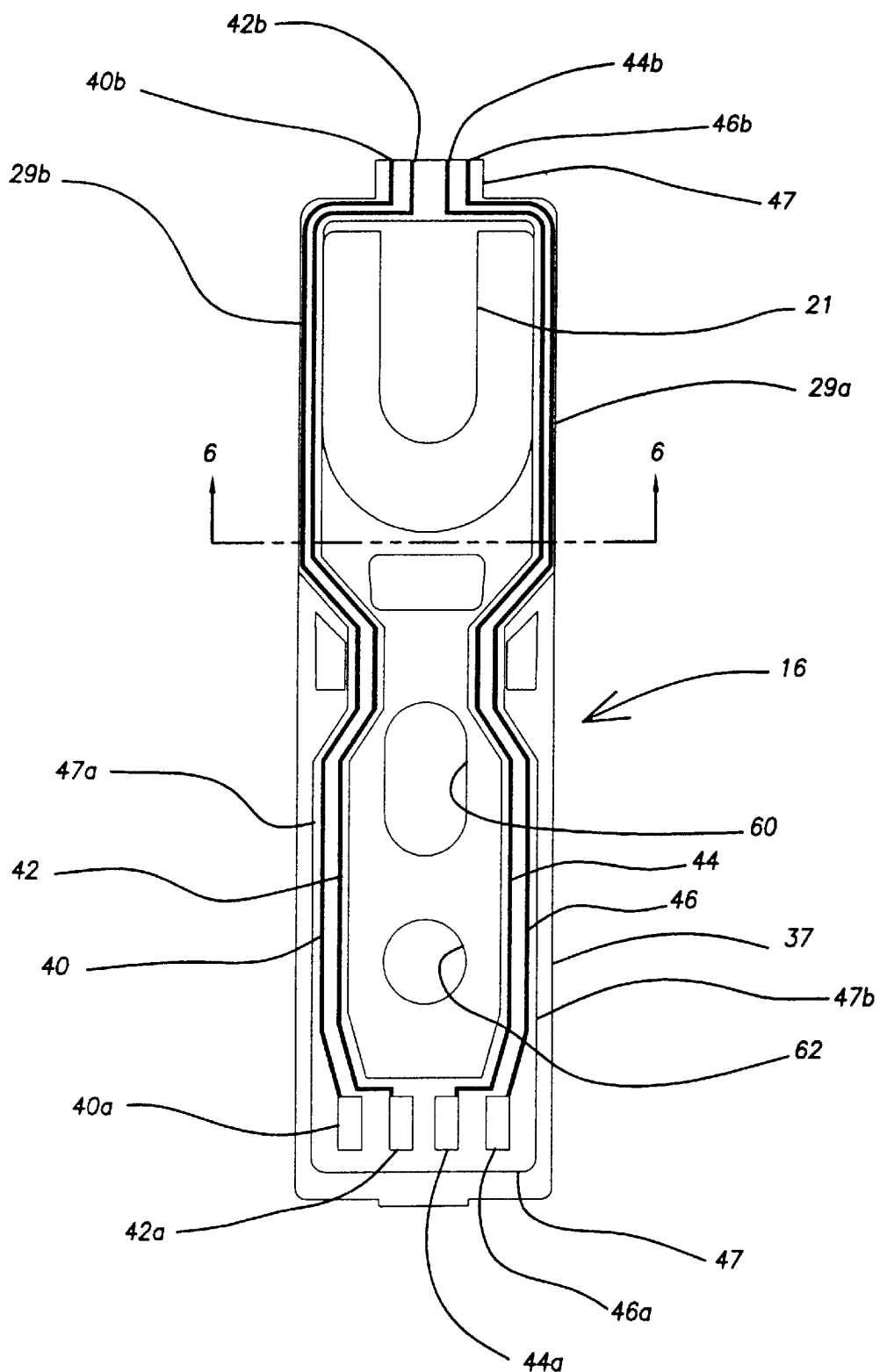
FIG. 4 is a bottom view of the flexure shown in FIG. 1.
Figure 6:
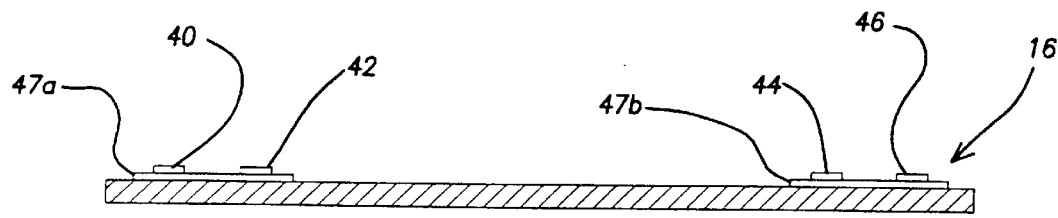
FIG. 6 is a sectional view of the flexure shown in FIG. 4 taken along section line 6—6 of FIG. 4.

Flexure 16 includes flexure electrical conductors 40, 42, 44, and 46, shown in FIG. 4, extending from a proximal end of flexure 16 to a distal end thereof. Flexure electrical conductors 40, 42, 44, and 46 terminate at the proximal end of flexure 16 with electrical contacts 40a, 42a, 44a, and 46a and terminate at the distal end of flexure 16 with electrical contacts 40b, 42b, 44b, and 46b. As shown in FIG. 6, which is a sectional view of flexure 16 taken along line 6—6 of FIG. 4, a first strip 47a of dielectric material extends beneath flexure electrical conductors 40 and 42 and electrical contacts 40a, 40b, 42a, and 42b. Also, a second strip 47b of dielectric material extends beneath conductors 44 and 46 and contacts 44a, 44b, 46a, and 46b. Strips 47a and 47b merge into a single layer 47 of dielectric at the proximal and distal ends of flexure 16.

Figure 2:
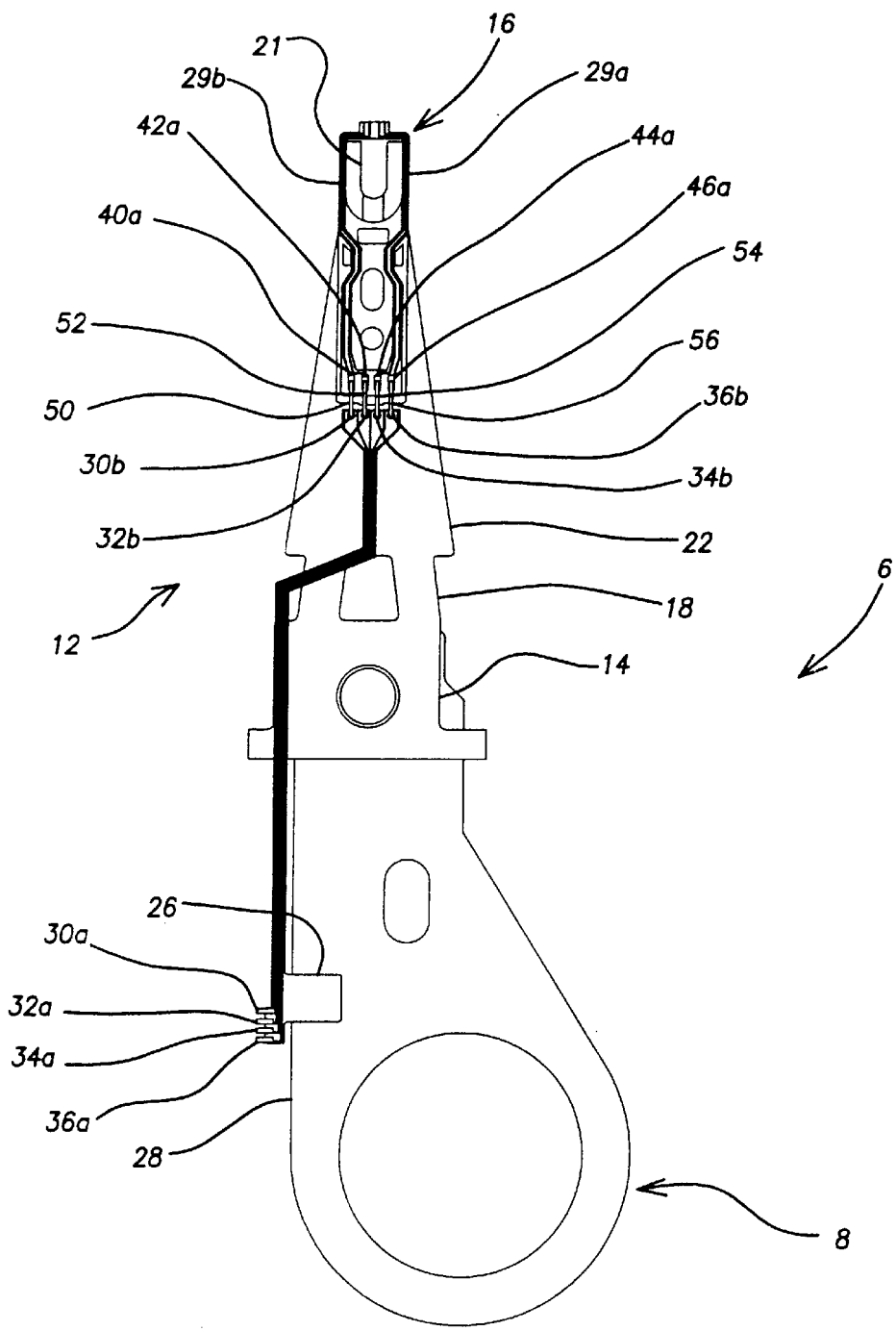
FIG. 2 is a bottom view of the head suspension shown in FIG. 1.

Electrical contacts 30b, 32b, 34b, and 36b, are electrically connected to electrical contacts 40a, 42a, 44a, and 46a by jumpers 50, 52, 54, and 56, respectively, shown in FIG. 2. In this way, contacts 30a, 32a, 34a, and 36a, respectively, at the lateral edge 28 of actuator arm 8 are electrically connected to contacts 40b, 42b, 44b, and 46b, respectively, at the distal end of flexure 16. A head slider (not shown) for supporting a read/write head (not shown) is to be mounted on flexure 16 and the read/write head is to be electrically connected to contacts 40b, 42b, 44b, and 46b. Accordingly, electrical read/write signals can be transmitted between the read/write head and contacts 30a, 32a, 34a, and 36a located at the lateral edge 28 of actuator arm 8 via flexure electrical conductors 40, 42, 44, and 46, respectively, and load beam electrical conductors 30, 32, 34, and 36, respectively.

As noted above, flexure 16 provides for pitch and roll movement of the head slider attached thereto so that the read/write head can accurately follow the data tracks of a spinning storage disk over which the read/write head and head slider are "flying." Typically, the head slider and read/write head fly extremely close to the disk on which information is stored. Manufacturers of disk drives currently strive to reach flying clearances close to 100 nm (0.1 $\mu$m). However, in most disk drives, the head assembly must not touch the disk ("crash") since impact with the spinning disk (often rotating at 3600 RPM or faster) can destroy both the head, the surface of the disk, and the stored data. Imperfections on the surface of the rotating disk can make it even more difficult to avoid a crash of the head slider and read/write head into the disk. Accordingly, in order to avoid crashes, flexure 16 must remain relatively flexible so that it can fly close to the disk surface and quickly react to imperfections.

Further, if the mass of flexure 16 becomes too large, the inertial shock from stopping the read/write head over a data track can cause the read/write head to overshoot the correct data track and generate vibrations of flexure 16. These vibrations then have to decay a certain amount before data can be reliably written or read from the data track. This can increase data storage and retrieval time. In general, to reduce the time for such vibrations to decay, flexure 16 should remain relatively light. Accordingly, flexure 16 and flexure conductors 40, 42, 44, and 46 and contacts 40a, 40b, 42a, 42b, 44a, 44b, 46a, and 46b are formed to be relatively thin and narrow such that they will be both relatively low mass and flexible and will thus have desirable dynamic characteristics.

To form flexure 16, including distal conductors 40, 42, 44, and 46 and contacts 40a, 40b, 42a, 42b, 44a, 44b, 46a, and 46b, to be relatively low mass and flexible, additive or sequential deposition fabrication methods such as known sputtering, evaporation, and/or photolithographic techniques are used.

Figure 9:
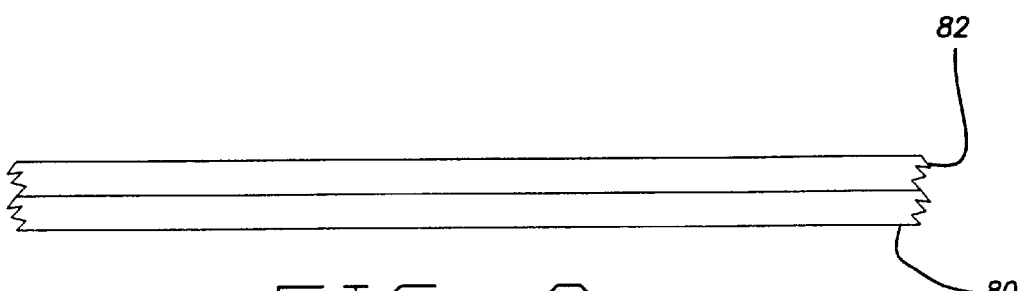
FIG. 9 is a side view of a built up laminated sheet having two layers which can be used in forming the flexure shown in FIG. 1.
Figure 10:
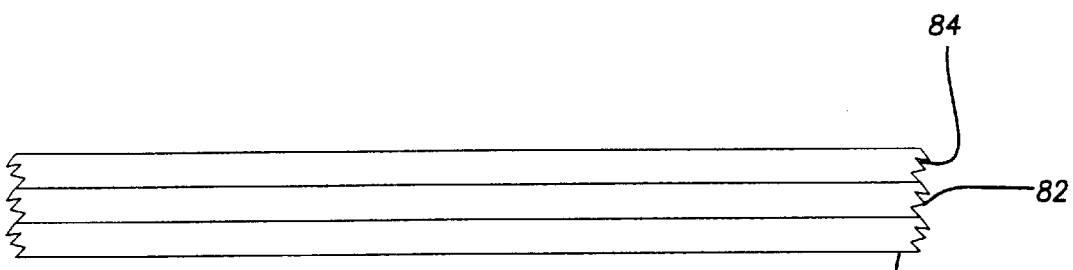
FIG. 10 is a side view of a built up laminated sheet having three layers which can be used in forming the flexure shown in FIG. 1.
Figure 11:
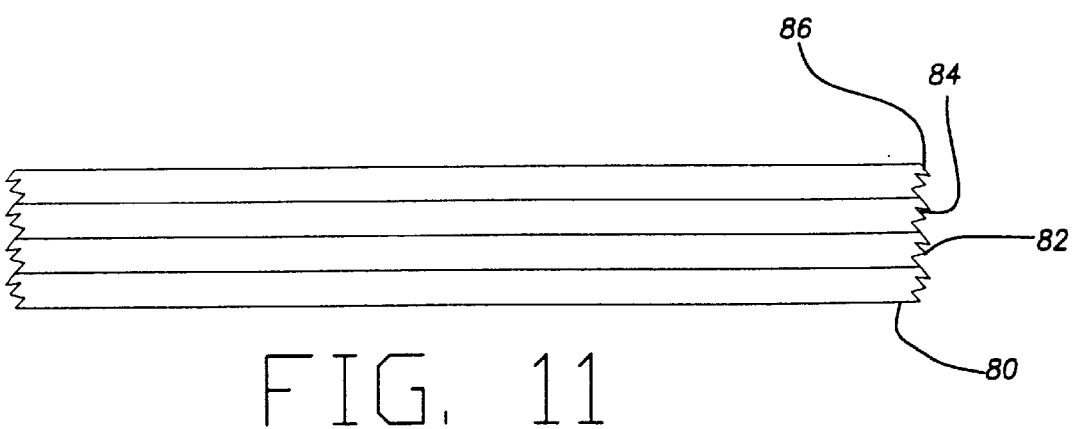
FIG. 11 is a side view of a built up laminated sheet having 4 layers which can be used to form the flexure shown in FIG. 1.

Preferably, in one additive method for fabricating flexure 16 shown in FIGS. 8–12, a sheet 80 of stainless steel is coated and patterned with a standard photosensitive polyimide layer 82 as shown in FIG. 9. As shown in FIG. 10, a seedlayer 84 of chromium or chromium and copper is then sputtercoated over the polyimide layer and coated and patterned with photoresist. A layer 86 of copper is plated thereon, as shown in FIG. 11. The photoresist is stripped to form strip 47, including strips 47a and 47b, of polyimide coated with copper. The seedlayer 84 can then be etched to form conductors 40, 42, 44, and 46 and contacts 40a, 40b, 42a, 42b, 44a, 44b, 46a, and 46b which can be plated for protection thereof. Both sides of the stainless steel/polyimide/copper sheet are then coated with photoresist and exposed. The photoresist is developed, etched and stripped, to form tongue 21, arms 29a and 29b, and apertures 60 and 62 in sheet 80 of stainless steel. A dielectric cover coat is then preferably applied over flexure 16 including tongue 21. The dielectric cover coat protects the electrical conductors 40, 42, 44 and 46. In particular, the cover coat allows an electrical conductor or conductors 40, 42, 44 and/or 46 to be re-routed over the portion of tongue where 21 a head slider is mounted while preventing unintended direct contact, either electrical or otherwise, between the head slider and the re-routed electrical conductor or conductors 40, 42, 44, and/or 46. This allows routing of flexure electrical conductors as needed on tongue 21 to facilitate making of necessary electrical connections between flexure electrical conductors 40, 42, 44, and 46 and a head slider supporting a read/write head. All of the above steps can be performed using conventional or otherwise known methods. Other standard additive methods known in the art can also be used to form flexure 16.

Forming flexure 16 including flexure conductors 40, 42, 44, and 46 and contacts 40a, 40b, 42a, 42b, 44a, 44b, 46a, and 46b using the above described additive method or other known additive methods, allows flexure 16 to be relatively low mass and flexible. In this way, flexure 16 can possess desirable dynamic characteristics.

It is to be noted that the exact design of flexure 16 shown in FIGS. 1, 2, and 4 is not critical to the present invention. Any design of a flexure having electrical components thereon and which can be manufactured using additive techniques is contemplated for use with the present invention.

Figure 3:
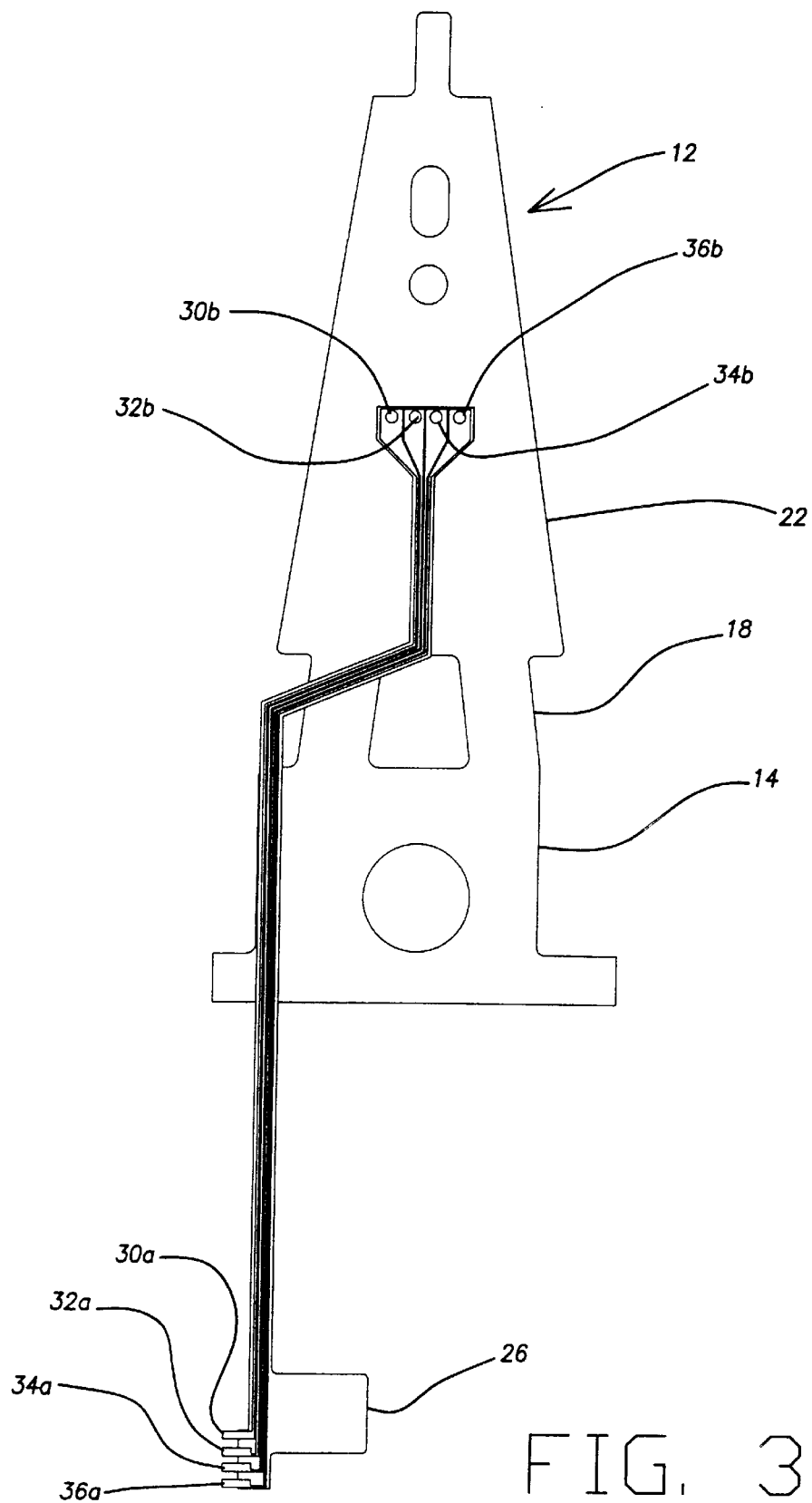
FIG. 3 is a bottom view of the load beam shown in FIG. 1.

Load beam 12 does not have the same dynamic requirements as flexure 16. While it is desirable that load beam 12 be relatively low mass, it does not need to be as low mass as flexure 16. Further, it is desirable that the rigid region 22 and mounting region 14 be relatively stiff. Also, it is desirable that the spring region 18 be resilient only in a direction normal to the planar surface of the load beam; allowance for pitch and roll motion of the read/write head and head slider is not necessary. As such, electrical components attached to load beam 12, such as load beam conductors 30, 32, 34, and 36 and contacts 30a, 30b, 32a, 32b, 34a, 34b, 36a, and 36b, can be less flexible and need not be as low mass as flexure conductors 40, 42, 44, and 46 and contacts 40a, 40b, 42a, 42b, 44a, 44b, 46a, and 46b attached to flexure 16. Further, as shown in FIGS. 1, 2 and 3, load beam conductors 30, 32, 34, and 36 do not extend over the entire longitudinal length of spring region 18 but extend partially transversely across spring region 18 and off a lateral edge of load beam 12. As such, conductors 30, 32, 34 and 36 have a reduced effect on the spring characteristics of load beam 12. This makes the flexibility of conductors 30, 32, 34, and 36 even less important to the mechanical performance of the load beam. In general, therefore, it is not as important to use components which are as low mass and flexible as those which can be produced using additive methods to produce desirable dynamic characteristics in load beam 12.

Electrical conductors having greater cross sectional dimensions (that is, greater width and depth) can be desirable on load beam 12. Conductors having greater cross sectional area have less electrical resistance per unit length. The lower the total electrical resistance of conductors 30, 32, 34, and 36, the lower the possibility of read/write signal degradation. Because load beam conductors 30, 32, 34, and 36 extend over a greater distance than flexure conductors 40, 42, 44, and 46, it is advantageous for load beam conductors to have lower electrical resistance per unit length to reduce the possibility of read/write signal degradation. As noted above, additive methods can be relatively expensive to use in head suspension manufacture, and fabrication of larger electrical components using additive processes is commensurately more expensive.

Figure 7:
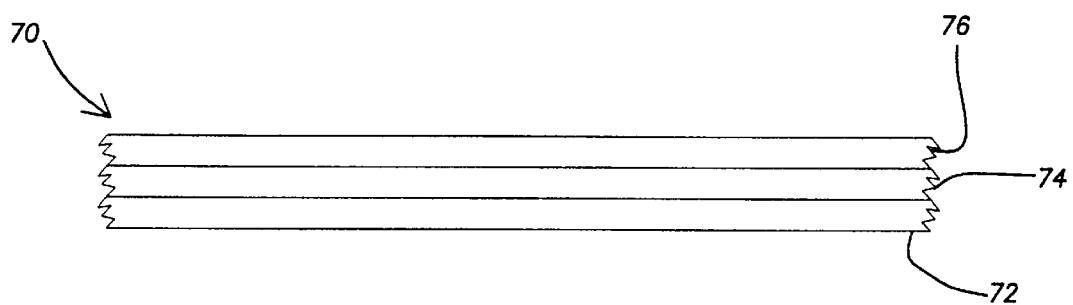
FIG. 7 is a side view of a sheet of laminated material from which the load beam shown in FIG. 1 can be fabricated.
Figure 8:
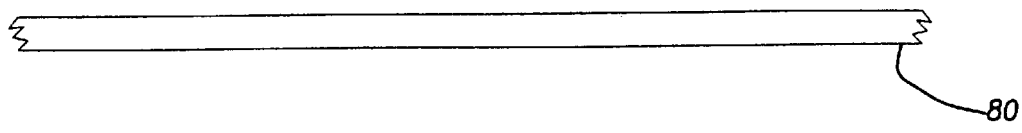
FIG. 8 is a side view of a sheet of material which can be used in forming the flexure shown in FIG. 1.

Accordingly, load beam 12 is formed using subtractive methods, which can be less expensive than additive methods. Preferably, as shown in FIG. 7 load beam 12 of head suspension 6 can be formed from a laminated sheet 70 constructed of a first layer 72 of stainless steel overlaying a second layer 74 of polyimide overlaying third layer 76 of copper or copper alloy. Laminated sheets such as laminated sheet 70 are available from Rogers Corporation of Rogers, Conn. or NSCC (Nippon Steel Chemical Corp.) of Japan. Photoresist is applied to both sides of laminated sheet 70 and both sides are exposed. The photoresist on the third layer 76 of copper alloy is developed and etched to form electrical conductors 30, 32, 34 and 36 and electrical contacts 30a, 32a, 34a, 36a, 30b, 32b, 34b, and 36b. The photoresist on first layer 72 of stainless steel is then developed and etched to form the overall shape of load beam 12 and features of load beam 12 such as apertures.

The photoresist is stripped from both sides of sheet 70 and a dry film photoresist is applied to both sides of sheet 70. The photoresist is exposed and developed and plasma etching techniques are used to form the second layer 74 of polyimide into strip 27. A dielectric cover coat can then be applied to sheet 70 to protect the copper or copper alloy features. The above coating and etching processes can all be performed using conventional or otherwise known methods. To complete load beam 12, edge rails can be bent up at the side of the rigid region.

It is also within the scope of the invention to form load beam 12 from a laminated sheet of material having greater or fewer than three layers. Further, any load beam design having electrical components thereon and which can be manufactured using subtractive techniques is contemplated for use with the present invention; it is not critical that the design of load beam 12 shown in FIGS. 1, 2, and 3 be used.

Flexure 16 is attached to load beam 12 by adhesive, laser welding or other methods. Jumpers 50, 52, 54, and 56 are soldered, laser welded, gold ball bonded, ultrasonic wedge bonded, hot bar reflow soldered, or otherwise adhered and electrically connected to contacts 40a, 42a, 44a, and 46a, respectively, and contacts 30b, 32b, 34b, and 36b, respectively, to electrically connect the two sets of contacts. Contacts 40a, 42a, 44a, and 46a can also be electrically connected to contacts 30a, 32a, 34a, and 36a, respectively, by directly soldering the contacts, melting the contacts together, or using other known methods. Spring region 18 of load beam 12 can then be rolled to create the proper bias for head suspension 6 to allow a head slider and read/write head attached thereto to fly over the surface of a spinning disk at the correct height. Actuator arm 8 is formed of stainless steel or other rigid material and can be fabricated using known methods. Load beam 12 is mounted to actuator arm 8 by soldering, welding, adhesive, or other known methods. Tab 26 is connected to a lateral edge 28 of actuator arm 8 by welding, adhesive or other known methods.

By forming flexure 16 using additive methods and load beam 12 using subtractive methods, it is possible to optimize the manufacturing of a head suspension such as head suspension 6 having electrical components formed integrally therewith such as conductors 30, 32, 34, 36, 40, 42, 44, and 46 and contacts 30a, 30b, 32a, 32b, 34a, 34b, 36a, 36b, 40a, 40b, 42a, 42b, 44a, 44b, 46a, and 46b. The flexure can be formed to have desirable physical characteristics such as low mass and flexibility while the load beam can be formed at a reduced cost while retaining important dynamic characteristics such as resiliency of the radius region. Further, because flexure 16 is relatively smaller than load beam 12, a greater number of flexures such as flexure 16 can be fabricated in a single batch using additive methods than could load beams such as load beam 12. Thus, is can be less expensive to manufacture only flexure 16 using additive methods than both load beam 12 and flexure 16.

Though the present invention has been described with reference to preferred embodiments, those skilled in the art will recognize that changes can be made in form and detail without departing from the spirit and scope of the invention.

What is claimed is:

1. A head suspension for supporting a read/write head, comprising:

a load beam formed from a laminated sheet having at least an electrically conducting layer and a load beam base layer, the load beam having a rigid region adjacent to a distal end and etched load beam electrical conductors formed by etching the electrically conducting layer;

a flexure at the distal end of the load beam for supporting a head slider and having deposited flexure electrical conductors formed by depositing conductors over a flexure base layer, wherein the flexure electrical conductors are relatively more thin, more flexible and lower mass than the load beam electrical conductors; and electrical interconnects between the load beam electrical conductors and the flexure electrical conductors.

2. The head suspension of claim 1 wherein dielectric material extends between the load beam electrical conductors and the load beam base and between the flexure electrical conductors and the flexure base.

3. The head suspension of claim 1 wherein the flexure is formed separately from the load beam.

4. The head suspension of claim 1 further including an actuator arm to which the head suspension is mounted.

5. The head suspension of claim 4 wherein the load beam electrical conductors extend adjacent to the actuator arm.

6. The head suspension of claim 1 wherein the electrical interconnects include electrical jumpers.

7. The head suspension of claim 1 wherein the electrical interconnects include direct connections between the load beam electrical conductors and the flexure electrical conductors.

8. The head suspension of claim 1 wherein the load beam electrical conductors and flexure electrical conductors include copper.

9. The head suspension of claim 1 wherein the load beam further includes a mounting region at a proximal end and a spring region between the mounting region and the rigid region.

10. The head suspension of claim 9 wherein the load beam electrical conductors extend over the mounting region.

* * * * *